United States Patent
LiPiShan et al.

(10) Patent No.: US 11,261,319 B2
(45) Date of Patent: Mar. 1, 2022

(54) ETHYLENE/α-OLEFIN/NONCONJUGATED POLYENE INTERPOLYMER COMPOSITIONS AND ARTICLES PREPARED FROM THE SAME

(71) Applicant: Dow Global Technologies LLC, Midland, MI (US)

(72) Inventors: Colin LiPiShan, Freeport, TX (US); Juan C. Tuberquia, Freeport, TX (US); Teresita Kashyap, Freeport, TX (US); Isao Hattori, Kanagaua-ken (JP); Tao Han, Shanghai (CN); Cory M. Thomas West, Freeport, TX (US)

(73) Assignee: Dow Global Technologies LLC, Midland, MI (US)

( * ) Notice: Subject to any disclaimer, the term of this patent is extended or adjusted under 35 U.S.C. 154(b) by 20 days.

(21) Appl. No.: 16/473,089

(22) PCT Filed: Dec. 26, 2016

(86) PCT No.: PCT/CN2016/112090
§ 371 (c)(1),
(2) Date: Jun. 24, 2019

(87) PCT Pub. No.: WO2018/119570
PCT Pub. Date: Jul. 5, 2018

(65) Prior Publication Data
US 2019/0345318 A1     Nov. 14, 2019

(51) Int. Cl.
*C08L 23/16* (2006.01)
*C08L 23/06* (2006.01)
*C08L 91/00* (2006.01)

(52) U.S. Cl.
CPC .............. *C08L 23/16* (2013.01); *C08L 23/06* (2013.01); *C08L 91/00* (2013.01); *C08J 2323/16* (2013.01); *C08J 2423/16* (2013.01)

(58) Field of Classification Search
CPC ........................................................ C08L 23/16
See application file for complete search history.

(56) References Cited

U.S. PATENT DOCUMENTS

| | | |
|---|---|---|
| 5,162,441 A | 11/1992 | Nakata et al. |
| 5,610,254 A | 3/1997 | Sagane et al. |
| 5,691,413 A | 11/1997 | Morikawa et al. |
| 6,319,998 B1 | 11/2001 | Cozewith et al. |
| 6,384,290 B1 | 5/2002 | Koshiba |
| 6,388,016 B1 | 5/2002 | Abdou-Sabet et al. |
| 8,772,414 B2 * | 7/2014 | Liang ................. C08L 23/16 525/331.8 |
| 10,167,383 B2 | 1/2019 | Karjala et al. |
| 2009/0209672 A1 | 8/2009 | Ebata et al. |
| 2011/0233448 A1 | 9/2011 | Ebata et al. |
| 2015/0259491 A1 * | 9/2015 | LiPiShan .............. C08F 210/18 428/36.9 |
| 2015/0274867 A1 * | 10/2015 | LiPiShan .............. C08F 210/18 428/36.9 |
| 2016/0122520 A1 | 5/2016 | Jung et al. |
| 2018/0037727 A1 | 2/2018 | Karjala et al. |

FOREIGN PATENT DOCUMENTS

| | | |
|---|---|---|
| WO | 2011/008837 A1 | 1/2011 |
| WO | 2014/084892 A1 | 6/2014 |
| WO | 2016/109264 A1 | 7/2016 |

* cited by examiner

Primary Examiner — Irina Krylova
(74) Attorney, Agent, or Firm — Quarles & Brady LLP (57) ABSTRACT

A composition composed of at least a first ethylene/α-olefin/nonconjugated polyene interpolymer, which can be used to produce low compression set, foamed rubber materials, articles made from the composition, and methods of producing the composition and articles.

15 Claims, 2 Drawing Sheets

ETHYLENE/α-OLEFIN/NONCONJUGATED POLYENE INTERPOLYMER COMPOSITIONS AND ARTICLES PREPARED FROM THE SAME

BACKGROUND OF THE INVENTION

There is a need for polymer compositions that have balanced cell expansion, smooth extruded surfaces and low water absorption for the targeted foam density, for producing foamed materials, particularly foamed, sponge weather-strip materials. For certain OEM manufacturers which produce car doors that are lighter and require thinner weather seals, existing polymers do not possess the necessary properties to meet tensile, compression set, surface quality or extrusion shape requirements for sponge weather seals. Therefore, there is a need for a polymer composition for forming sponge weather strips and other sponge articles with improved mechanical properties, surface quality and lower foam densities, and which have thinner profiles and are lighter in weight. Such a material would be useful, for example, for reducing automotive vehicle weight for improved fuel efficiency. These needs have been met by the following invention.

SUMMARY OF THE INVENTION

In embodiments, the invention provides a first composition comprising a first ethylene/and a second ethylene/α-olefin/nonconjugated polyene interpolymer;
wherein the first composition comprises the following properties:
 a) a molecular weight distribution (Mw/Mn) greater than 3.5; and
 b) an absolute value of tan delta slope defined as $$m = \left| \frac{[tandelta_{@0.1\ rad/s} - tandelta_{@100\ rad/s}] * 1000}{0.1\ rad/s - 100\ rad/s} \right|,$$

and m is from 3.5 to 40.

In another aspect, the invention provides a composition comprising the first composition. In another aspect, the invention provides a crosslinked composition formed from the composition as disclosed herein. In another aspect, the invention provides an article comprising at least one component formed from the composition as disclosed herein. In yet another aspect, the invention provides a process to form the first composition.

DETAILED DESCRIPTION OF THE PREFERRED EMBODIMENT

Various embodiments of the present invention relate to a first composition comprising a first ethylene/α-olefin/nonconjugated polyene interpolymer and a second ethylene/α-olefin/nonconjugated polyene interpolymer; wherein the first composition comprises the following properties:
 a) a molecular weight distribution (Mw/Mn) greater than 3.5; or 3.75, or 4.0
 b) an absolute value of tan delta slope defined as $$m = \left| \frac{[tandelta_{@0.1\ rad/s} - tandelta_{@100\ rad/s}] * 1000}{0.1\ rad/s - 100\ rad/s} \right|$$

from 3.5 to 40, further from 4.0 to 35, further from 4.5 to 30, further from 5.0 to 25.

In an embodiment, the sum weight of the first ethylene/α-olefin/nonconjugated polyene interpolymer and the second ethylene/α-olefin/nonconjugated polyene interpolymer is ≥95 wt %, or ≥96 wt %, or ≥97 wt %, or ≥98 wt %, or ≥99 wt %, based on the weight of the first composition.

In an embodiment, the sum weight of the first ethylene/α-olefin/nonconjugated polyene interpolymer and the second ethylene/α-olefin/nonconjugated polyene interpolymer is ≥60 wt %, or ≥65 wt %, or ≥70 wt %, or ≥75 wt %, or ≥80 wt %, based on the weight of the first composition.

In an embodiment, the first composition comprises an amount of ethylene from 40 to 70 wt %, or from 45 to 65 wt %, or from 50 to 60 wt %, based on the weight of the first and second interpolymers.

In an embodiment, the first composition comprises an amount of polyene of greater than 6 wt %, or greater than 7 wt %, or greater than 8 wt %, or greater than 9 wt %, to up to 12 wt %, or up to 15 wt %, based on the weight of the first and second interpolymers. In an embodiment, the polyene is a diene. In an embodiment, the diene is ENB (5-ethylidene-2-norbornene).

In and embodiment, the first composition comprises an amount of polyene of from 6 to 20 wt %, or from 7 to 15 wt %, or from 8 to 12 wt %, or from 9 to 11 wt %, based on the weight of the first and second interpolymers.

In an embodiment, the first interpolymer is EPDM and the second interpolymer is EPDM.

In an embodiment, the first composition has a weight average molecular weight (Mw(conv))≥150,000, or ≥160,000, or ≥170,000, or ≥180,000, or ≥190,000, or ≥200,000 or ≥210,000, or ≥220,000, or ≥230,000 g/mol. In an embodiment, the first composition has a weight average molecular weight (Mw)≤600,000, or ≤500,000, or ≤400,000, or ≤350,000, or ≤300,000, g/mol.

In an embodiment, the first composition has a molecular weight distribution (Mw(conv)/Mn(conv))≥3.50, or ≥3.70, or ≥3.90, or ≥4.00, or ≥4.20, or ≥4.40, or ≥4.50. In an embodiment, the first composition has a molecular weight distribution (Mw(conv)/Mn(conv))≤6.50, or ≤6.20≤6.10, or ≤6.00.

In an embodiment, the first composition has a z average molecular weight (Mz(conv))≥700,000, or ≥720,000, or ≥740,000, or ≥760,000, or ≥780,000, or ≥800,000 or ≥820,000, or ≥840,000, or ≥860,000 g/mol. In an embodiment, the first composition has a z average molecular weight (Mz)≤1,600,000, or ≤1,400,000, or ≤1,200,000, or ≤1,000,000, or 5990,000 g/mol.

In one embodiment, the first composition has a "peak area from 21.3 to 2.8 ppm" of ≥12, or ≥13, or ≥14, or ≥15, or ≥16, or ≥17, or ≥18, or ≥19, or ≥20, as determined by 13C NMR (propylene tacticity marker). In an embodiment, the first composition has a "peak area from 21.3 to 2.8 ppm" of ≤25, or ≤26, or ≤27, or ≤28, or ≤29, or ≤30, as determined by 13C NMR (propylene tacticity marker).

In an embodiment, the first composition has a tan delta (at 0.1 rad/s) and Mz that meets the following relationship: tan delta $(0.1 \text{ rad/s}) \geq -(6.054 \times 10^{-7} \text{ mol/g}) \times Mz + 1.25$. In a further embodiment, the first composition has a tan delta (at 0.1 rad/s) and Mz that meets the following relationship: tan delta $(0.1 \text{ rad/s}) \geq -(6.054 \times 10^{-7} \text{ mol/g}) \times Mz + 1.43$.

In one embodiment, the first composition has a g' value of ≥0.5, or ≥0.6, or ≥0.7, or ≥0.8. In one embodiment, the first composition has a g' value of ≤1.5, or ≤1.4, or ≤1.3, or ≤1.2, or ≤1.1, or ≤1.0, or ≤0.9.

In one embodiment, the first composition has a Mooney viscosity (ML(1+4) at 125° C.) ≥10, or ≥15, or ≥20, or ≥25, or ≥30, or ≥35. In one embodiment, the first composition has a Mooney viscosity (ML(1+4) at 125° C.)≤100, or ≤90, or ≤80, or ≤70.

In one embodiment, the first composition has a (ML(1+4) at 125° C.) from 40 to 100, or from 50 to 90, or from 60 to 80. In a further embodiment, the first composition comprises ≥95 wt %, or ≥98 wt %, or ≥99 wt % of the sum of the first interpolymer and the second polymer, based on the weight of the first composition.

In one embodiment, the first composition has a (ML(1+4) at 125° C.) from 10 to 50, or from 15 to 40, or from 20 to 30. In a further embodiment, the first composition comprises from 5 to 35 wt %, or from 10 to 30 wt %, or from 15 to 25 wt % oil, based on the weight of the first composition.

Mooney viscosity is that of the composition without a filler unless otherwise noted. The first composition Mooney viscosity can be measured with and without oil.

In an embodiment, the first composition has a tan delta (0.1 rad/sec, 190° C.) value of ≤1.5, or ≤1.25, or ≤1.00, and >0, or ≥0.20 or ≥0.50, or ≥0.70, or ≥0.90.

In one embodiment, the first composition has a tan delta (0.1 rad/sec, 190° C.) value of ≥0.50 or ≥0.60, or ≥0.70, or ≥0.80. In one embodiment, the first composition has a tan delta (0.1 rad/sec, 190° C.) value of ≤1.40, or ≤1.30, or ≤1.20, or ≤1.10. In a further embodiment, the first composition comprises ≥95 wt %, or comprises ≥98 wt %, or comprises ≥99 wt % of the sum of the first interpolymer and the second polymer, based on the weight of the first composition.

In one embodiment, the first composition has a tan delta (0.1 rad/sec, 190° C.) value of ≥0.70 or ≥0.80, or ≥0.90, or ≥1.0. In one embodiment, the first composition has a tan delta (0.1 rad/sec, 190° C.) value of ≤1.50, or ≤1.45, or ≤1.40, or ≤1.35. In a further embodiment, the first composition comprises from 5 to 35 wt %, or from 10 to 30 wt %, or from 15 to 25 wt % oil, based on the weight of the first composition.

In an embodiment, the first composition has a tan delta (100 rad/sec, 190° C.) value of >0, or ≥0.10, or ≥0.20, or ≥0.30, or ≥0.40, and ≤1.0, or ≤0.75, or ≤0.60 or ≤0.50.

In one embodiment, the first composition has a tan delta (100 rad/sec, 190° C.) value of >0.30, or ≥0.35, or ≥0.40, or ≥0.45. In one embodiment, the first composition has a tan delta (100 rad/sec, 190° C.) value ≤0.65, or ≤0.60, or ≤0.55 or ≤0.50. In a further embodiment, the first composition comprises 95 wt %, or comprises ≥98 wt %, or comprises ≥99 wt % of the sum of the first interpolymer and the second polymer, based on the weight of the first composition.

In one embodiment, the first composition has a tan delta (100 rad/sec, 190° C.) value of >0.35, or ≥0.40, or ≥0.45, or ≥0.50. In one embodiment, the first composition has a tan delta (100 rad/sec, 190° C.) value ≤0.75, or ≤0.70, or ≤0.65 or ≤0.60. In a further embodiment, the first composition comprises from 5 to 35 wt %, or from 10 to 30 wt %, or from 15 to 25 wt % oil, based on the weight of the first composition.

In an embodiment, the first composition has a viscosity (V0.1 rad/sec, 190° C.) of ≥50,000, or ≥60,000, or ≥70,000, or ≥80,000, or ≥90,000, or ≥150,000, or ≥175,000, or ≥200,000. In an embodiment, the first composition has a viscosity (V0.1 rad/sec, 190° C.) of ≤500,000, or ≤450,000, or ≤400,000, or ≤350,000, or ≤300,000, or ≤200,000, or ≤150,000, or ≤120,000, or ≤110,000.

In one embodiment, the first composition has a viscosity (V0.1 rad/sec, 190° C.) of ≥150,000, or ≥175,000, or ≥190,000, or ≥200,000. In an embodiment, the first composition has a viscosity (V0.1 rad/sec, 190° C.) of ≤400,000, or ≤375,000, or ≤350,000, or ≤325,000, or ≤300,000. In a further embodiment, the first composition comprises ≥95 wt %, or comprises ≥98 wt %, or comprises ≥99 wt % of the sum of the first interpolymer and the second polymer, based on the weight of the first composition.

In one embodiment, the first composition has a viscosity (V0.1 rad/sec, 190° C.) of ≥50,000, or ≥60,000, or ≥65,000, or ≥70,000. In an embodiment, the first composition has a viscosity (V0.1 rad/sec, 190° C.) of ≤130,000, or ≤120,000, or ≤115,000, or ≤110,000. In a further embodiment, the first composition comprises from 5 to 35 wt %, or from 10 to 30 wt %, or from 15 to 25 wt % oil, based on the weight of the first composition.

In one embodiment, the first composition has a viscosity ratio (V0.1 rad/sec, 190° C./V100 rad/sec, 190° C.) from 20 to 115, or from 25 to 110, or from 30 to 105, or from 35 to 100, or from 40 to 95.

In one embodiment, the first composition has a viscosity ratio (V0.1 rad/sec, 190° C./V100 rad/sec, 190° C.) from 45 to 115, or from 50 to 110, or from 60 to 100, or from 65 to 95. In a further embodiment, the first composition comprises ≥95 wt %, or comprises ≥98 wt %, or comprises ≥99 wt % of the sum of the first interpolymer and the second polymer, based on the weight of the first composition.

In one embodiment, the first composition has a viscosity ratio (V0.1 rad/sec, 190° C./V100 rad/sec, 190° C.) from 20 to 95, or from 25 to 85, or from 30 to 80, or from 35 to 75, or from 40 to 70. In a further embodiment, the first composition comprises from 5 to 35 wt %, or from 10 to 30 wt %, or from 15 to 25 wt % oil, based on the weight of the first composition.

In an embodiment, the first composition has a "m" value (absolute of tan delta slope) of ≥1.0, or ≥2.0, or ≥3.5, or ≥4.0. In an embodiment, the first composition has a "m" value of ≤20.0 or ≤15.0, or ≤12.0, or ≤10.0, or ≤8.0. The absolute of tan delta slope defined as $$m = \left| \frac{[tandelta_{@0.1 \ rad/s} - tandelta_{@100 \ rad/s}] * 1000}{0.1 \text{ rad/s} - 100 \text{ rad/s}} \right|.$$

In one embodiment, the first composition has a density of ≤0.890, or ≤0.880, or ≤0.875, or ≤0.870, or ≤0.865, or ≤0.860, g/cc. In one embodiment, the first composition has a density of ≥0.850 g/cc. or ≥0.855 g/cc (1 cc=1 cm³).

In one embodiment, the first composition has a weight ratio of the first interpolymer to the second interpolymer is from 20/80 to 50/50, or from 25/75 to 45/55, or from 30/70 to 40/60, or from 32/68 to 38/62. In one embodiment, the first composition has a weight ratio of the first interpolymer to the second polymer is from 25/75 to 55/45, or from 30/70 to 50/50, or from 35/65 to 30/70.

The first composition may comprise a combination of two or more embodiments described herein.

Composition

A composition, comprising the first composition, may comprise a combination of two or more embodiments described herein.

In an embodiment, the inventive composition comprises the first composition comprised of the first and second ethylene/α-olefin/nonconjugated polyene interpolymers, in an amount of 20 to 80 wt %, or 30 to 70 wt %, of based on the weight of the inventive composition.

In an embodiment, the second composition comprises at least one filler, at least one oil, and/or at least one crosslinking/vulcanizing agent.

In an embodiment, the inventive composition further comprises one or more crosslinking/vulcanizing agents. In an embodiment the inventive composition comprises a crosslinking/vulcanizing agent in an amount of from 0.1 to 5 wt %, or from 0.5 to 4 wt %, based upon the weight of the composition.

In an embodiment, the composition further comprises an oil. In an embodiment, the composition comprises oil in an amount of less than 30 wt %, or less than 25 wt %, or less than 20 wt %, or less than 15 wt %, or less than 10 wt %, based on the weight of the composition.

In an embodiment, the composition further comprises a blowing agent, which alone or in combination with other substances, is capable of rendering the composition foamable to produce a cellular structure. In an embodiment, the inventive composition comprises one or more blowing agents in an amount of 0.1 to 3.0 wt %, or 0.5 to 2.0 wt %, based on the weight of the composition.

Also provided is an article comprising at least one component formed from an inventive composition of any embodiment described herein.

In an embodiment, the article is a foam. In an embodiment, the article is selected from the group consisting of profiles, injection molded parts, gaskets, automotive parts, building and construction materials, shoe components and tubes.

An inventive article may comprise a combination of two or more embodiments as described herein.

The invention also provides a process for preparing the composition of any embodiment described herein. In an embodiment, the process comprises polymerizing, in solution, at least the following: ethylene, an alpha-olefin (α-olefin), and a nonconjugated polyene. In a further embodiment, the ethylene, an α-olefin and a nonconjugated polyene are polymerized in a continuous solution polymerization process.

In an embodiment, the first interpolymer is produced in a first and second reactor. In an embodiment the temperature difference between the first and second reactors is greater than 40° C., or greater than 50° C., or greater than 60° C. In an embodiment, a ratio of the reactor temperature of the first reactor to the second reactor is less than 0.9, or less than 0.75, or less than 0.65. In an embodiment, a ratio of the reactor temperature of the first reactor to the second reactor is greater than 0.55, or greater than 0.60, or less than 0.62.

In an embodiment, the difference in ethylene conversion between the first and second reactors is greater than or equal to 20%, or greater than or equal to 25%, or greater than or equal to 30%. In an embodiment, a ratio of ethylene conversion within the first reactor and the second reactor is less than 0.75, or less than 0.65, or less than 0.6. In an embodiment, a ratio of ethylene conversion within the first reactor and the second reactor is greater than 0.50, or greater than 0.55, or greater than 0.6.

In one embodiment, the weight ratio of the first interpolymer to the second interpolymer is from 20/80 to 50/50, or from 25/75 to 45/55, or from 30/70 to 40/60, or from 32/68 to 38/62.

An inventive process may comprise a combination of two or more embodiments as described herein.

First and Second Ethylene/α-Olefin/Nonconjugated Polyenes Interpolymers

The first ethylene/α-olefin/nonconjugated polyene interpolymers and the second ethylene/α-olefin/nonconjugated polyene interpolymers for the inventive compositions described herein, each comprise, in polymerized form, ethylene, an α-olefin, and a nonconjugated polyene.

The α-olefin may be either an aliphatic or an aromatic compound. In an embodiment, the α-olefin is a $C_3$-$C_{20}$ aliphatic compound, preferably a $C_3$-$C_{16}$ aliphatic compound, and more preferably a $C_3$-$C_{10}$ aliphatic compound. Preferred $C_3$-$C_{10}$ aliphatic α-olefins are selected from the group consisting of propylene, 1-butene, 1-hexene and 1-octene, and more preferably propylene.

Suitable examples of nonconjugated polyenes include the $C_4$-$C_{40}$ nonconjugated dienes. Illustrative nonconjugated polyenes include straight chain acyclic dienes such as 1,4-hexadiene and 1,5-heptadiene; branched chain acyclic dienes such as 5-methyl-1,4-hexadiene, 2-methyl-1,5-hexadiene, 6-methyl-1,5-heptadiene, 7-methyl-1,6-octadiene, 3,7-dimethyl-1,6-octadiene, 3,7-dimethyl-1,7-octadiene, 5,7-dimethyl-1,7-octadiene, 1,9-decadiene, and mixed isomers of dihydromyrcene; single ring alicyclic dienes such as 1,4-cyclohexadiene, 1,5-cyclooctadiene and 1,5-cyclododecadiene; multi-ring alicyclic fused and bridged ring dienes, such as tetrahydroindene, methyl tetrahydroindene; alkenyl, alkylidene, cycloalkenyl and cycloalkylidene norbornenes such as 5-methylene-2-norbornene (MNB), 5-ethylidene-2-norbornene (ENB), 5-vinyl-2-norbornene, 5-propenyl-2-norbornene, 5-isopropylidene-2-norbornene, 5-(4-cyclopentenyl)-2-norbornene, and 5-cyclohexylidene-2-norbornene. In an embodiment, the polyene is a nonconjugated diene selected from the group consisting of ENB, dicyclopentadiene, 1,4-hexadiene, 7-methyl-1,6-octadiene. In embodiments, the polyene is ENB.

In an embodiment, the ethylene/α-olefin/nonconjugated polyene interpolymer comprises a majority amount of polymerized ethylene, based on the weight of the interpolymer. In an embodiment, the ethylene/α-olefin/nonconjugated polyene interpolymer is an ethylene/α-olefin/diene terpolymer (EAODM). In a further embodiment, the interpolymer is an ethylene/propylene/diene terpolymer (EPDM) terpolymer. In a further embodiment, the diene is 5-ethylidene-2-norbornene (ENB).

In an embodiment, the weight average molecular weight (Mw) of the first interpolymer is greater than the weight average molecular weight (Mw) of the second interpolymer.

In an embodiment, the first interpolymer has a weight average molecular weight (Mw) of ≥380,000, or ≥390,000, or ≥400,000, or ≥410,000, or ≥420,000, or ≥430,000, g/mol. In an embodiment, the first interpolymer has a weight average molecular weight (Mw)≤500,000, or ≤490,000, or ≤480,000, or ≤470,000, or ≤460,000, or ≤450,000, g/mol.

In an embodiment, the first interpolymer has a Mw/Mn of ≥1.50, or ≥1.70, or ≥1.90, or ≥2.00, or ≥2.30, or ≥2.50, or ≥2.70. In an embodiment, the first interpolymer has a Mw/Mn of ≤4.00, or ≤3.50, or ≤3.20, or ≤3.00.

In an embodiment, the first interpolymer has a z average molecular weight (Mz) of ≥800,000, or ≥840,000, or ≥860,000, or ≥880,000, or ≥900,000, or ≥930,000. In an embodiment, the first interpolymer has a Mz of ≤950,000, or ≤1,000,000, or ≤1,200,000, or ≤1,400,000, or ≤1,500,000.

In an embodiment, the first interpolymer has an ethylene content from 40 to 70 wt %, or from 45 to 65 wt %, or from 50 to 60 wt %, based on the weight of the first interpolymer.

In an embodiment, the first interpolymer has a polyene content of greater than 6 wt %, or greater than 7 wt %, or greater than 8 wt %, or greater than 9 wt %, to up to 12 wt %, or up to 15 wt %, based on the weight of the first interpolymer. In a further embodiment, the polyene is a diene, and further ENB.

In an embodiment, the first interpolymer has a g' value of ≥0.50, or ≥0.60, or ≥0.70, or ≥0.80. In an embodiment, the first interpolymer has a g' value of ≤1.50, or ≤1.20, or ≤1.00, or ≤0.90.

In an embodiment, the first interpolymer has tan delta (at 0.1 rad/sec) of ≥0, or ≥0.20, or ≥0.50, or ≥0.70, or ≥0.90, or ≥1.00. In an embodiment, the first interpolymer has tan delta (at 0.1 rad/sec) of ≤1.50, or ≤1.25, or ≤1.20.

In an embodiment, the first interpolymer has tan delta (at 100 rad/sec, 190° C.) of ≥0, or ≥0.05, or ≥0.10, or ≥0.15, or ≥0.20. In an embodiment, the first interpolymer has tan delta (at 100 rad/sec, 190° C.) of ≤0.50, or ≤0.35, or 50.30, or 50.25.

In an embodiment, the first interpolymer has a "m" value (absolute of tan delta slope) of ≥20.0, or ≥4.0, or ≥6.0, or ≥8.0, or ≥9.0. In an embodiment, the first interpolymer has a "m" value of ≤25.0, ≤20.0, or ≤15.0, or ≤12.0, or ≤10.0. The absolute of tan delta slope defined as $$m = \left| \frac{[tandelta_{@0.1\ rad/s} - tandelta_{@100\ rad/s}] * 1000}{0.1\ rad/s - 100\ rad/s} \right|.$$

In an embodiment, the first interpolymer has viscosity (at 0.1 rad/sec, 190° C.) of ≥625,000, or ≥650,000, or ≥675,000, or ≥700,000. In an embodiment, the first composition has a viscosity (V0.1 rad/sec, 190° C.) of ≤800,000, or ≤775,000, or ≤750,000, or ≤730,000.

In one embodiment, the first interpolymer has a viscosity ratio (V0.1 rad/sec, 190° C./V100 rad/sec, 190° C.) of ≥75.0, or ≥80.0, or ≥85.0, or ≥90.0, or ≥95.0. In an embodiment, the first interpolymer has a viscosity ratio (V0.1 rad/sec, 190° C./V100 rad/sec, 190° C.) of ≤130.0, ≤125.0, or ≤120.0, or ≤115.0, or ≤110.0.

In one embodiment, the first interpolymer has a Mooney viscosity (ML(1+4) at 125° C.) of ≥50, or ≥55, or ≥60, or ≥65, or ≥70, or ≥75. In an embodiment, the first interpolymer has a Mooney viscosity (ML(1+4) at 125° C.) of ≤150, ≤145, or ≤140, or ≤135, or ≤130, or ≤125.

In one embodiment, the first interpolymer has a "peak area from 21.3 to 2.8 ppm" of ≥12, ≥13, or ≥15, or ≥17, or ≥20, as determined by 13C NMR (propylene tacticity marker). In an embodiment, the first composition has a "peak area from 21.3 to 2.8 ppm" of ≤30, or ≤28 or ≤26, or ≤24, as determined by 13C NMR (propylene tacticity marker).

In an embodiment, the ratio of the viscosity (V0.1 at 190° C.) of the first interpolymer to the viscosity (V0.1, 190° C.) of the first composition is from 1.2 to 16, or from 1.4 to 15, or from 1.6 to 14, or from 1.8 to 13, or from 2.0 to 12, or from 2.2 to 11, or from 2.4 to 10.

In an embodiment, the ratio of the viscosity ratio (V0.1/V100 at 190 C) of the first interpolymer to the viscosity ratio (V0.1/V100, 190 C) of the first composition is from 1.01 to 7.00, or from 1.02 to 6.00, or from 1.03 to 5.00.

In an embodiment, the ratio of the tan delta (0.1 rad/s at 190 C) of the first interpolymer to the tan delta (0.1 rad/s, 190 C) of the first composition is from 0.5 to 3.0, or from 0.6 to 2.5, or from 0.7 to 2.0, or from 0.8 to 1.5.

In an embodiment, the ratio of the "m" value (absolute of tan delta slope) of the first interpolymer to the m value of the first composition is from 0.5 to 9.0, or from 0.7 to 6.0, or from 1.0 to 3.0, or from 1.1 to 2.0, or from 1.2 to 2.4. The absolute of tan delta slope defined as $$m = \left| \frac{[tandelta_{@0.1\ rad/s} - tandelta_{@100\ rad/s}] * 1000}{0.1\ rad/s - 100\ rad/s} \right|.$$

In an embodiment, the ratio of the Mw(conv) of the first interpolymer to the Mw(conv) of the first composition is from 1.3 to 3.0, or from 1.4 to 2.5, or from 1.5 to 2.2.

In an embodiment, the ratio of the MWD(conv) of the first interpolymer to the MWD(conv) of the first composition is from 0.20 to 0.95, or from 0.25 to 0.90, or from 0.30 to 0.85, or from 0.40 to 0.80, or from 0.50 to 0.70.

In an embodiment, the ratio of the Mz(conv) of the first interpolymer to the Mz(conv) of the first composition is from 0.7 to 1.3, or from 0.8 to 1.4, or from 0.9 to 1.2.

An ethylene/α-olefin/nonconjugated polyene interpolymer may comprise a combination of two or more embodiments described herein. An ethylene/α-olefin-/nonconjugated diene interpolymer may comprise a combination of two or more embodiments described herein. An EPDM terpolymer may comprise a combination of two or more embodiments as described herein.

Additives

A composition may comprise one or more additives, such as oils, crosslinking/vulcanizing agents, fillers, antioxidants and antiozonants, stabilizers, flame retardants, colorants or pigments, and thermoplastic polymers, among others.

Illustrative oils include, but are not limited to, petroleum oils, such as aromatic and naphthenic oils; polyalkylbenzene oils; organic acid monoesters, such as alkyl and alkoxyalkyl oleates and stearates; organic acid diesters, such as dialkyl, dialkoxyalkyl, and alkyl aryl phthalates, terephthalates, sebacates, adipates, and glutarates; glycol diesters, such as tri-, tetra-, and polyethylene glycol dialkanoates; trialkyl trimellitates; trialkyl, trialkoxyalkyl, alkyl diaryl, and triaryl phosphates; chlorinated paraffin oils; coumarone-indene resins; pine tars; vegetable oils, such as castor, tall, rapeseed, and soybean oils and esters and epoxidized derivatives thereof; and the like. In an embodiment, the oil is selected from the group consisting of nonaromatic oils, paraffinic oils, naphthenic oils, and combinations thereof. Suitable oils include, but are not limited to, SUNPAR 2280, PARALUX 6001, HYDROBRITE 550, and CALSOL 5550. An oil may comprise a combination of two or more embodiments as described herein.

Illustrative crosslinking/vulcanizing agents include, but are not limited to sulfur-containing compounds, such as elemental sulfur, 4,4'-dithiodimorpholine, thiuram di- and polysulfides, alkylphenol disulfides, and 2-morpholino-dithiobenzothiazole; peroxides, such as di-tertbutyl peroxide, tertbutylcumyl peroxide, dicumyl peroxide, 2,5-dimethyl-2, 5-di-(tertbutylperoxy) hexane, di-(tertbutylperoxyisopropyl) benzene, tertbutyl peroxybenzoate and 1,1-di-(tertbutylperoxy)-3,3,5-trimethylcyclohexane; azo-compounds; silanes, such as vinyl tri-ethoxy or vinyl tri-methoxy silane; metal oxides, such as zinc, magnesium, and lead oxides; dinitroso compounds, such as p-quinone-dioxime and p,p'-dibenzoylquinone-dioxime; phenol-formaldehyde resins containing hydroxymethyl or halomethyl functional groups; and other types of radical generators (e.g. N—O break type and C—C break type), among others. The suitability of any of these crosslinking/vulcanizing agents for use in the invention is well known to those skilled in the compounding arts. In an embodiment, the crosslinking/vulcanizing agent comprises a sulfur-containing compound.

Additional additives include, but are not limited to, fillers, antioxidants and antiozonants, stabilizers, flame retardants, colorants or pigments, thermoplastic polymers, and combinations thereof. Such additives can be employed in a desired amount to achieve their desired effect. Typically, such additives can be used in amounts ranging from less than 0.01 to 50 wt %, based on the total volume of the composition.

In an embodiment, the inventive composition further comprises at least one filler. Suitable fillers include, but are not limited to, clay, talc, carbon black, silicates of aluminum, magnesium, calcium, sodium, potassium, and mixtures thereof; carbonates of calcium, magnesium and mixtures thereof; oxides of silicon, calcium, zinc, iron, titanium, and aluminum; sulfates of calcium, barium, and lead; alumina trihydrate; magnesium hydroxide; natural fibers, synthetic fibers, and mineral fibers; among other fillers. In an embodiment, the filler is present in an amount from 5 to 30 wt %, based on the weight of the inventive composition.

In an embodiment, the inventive composition further comprises at least one antioxidant and/or antiozonant. Illustrative antioxidants and antiozonants include, but are not limited to, hindered phenols, bisphenols, and thiobisphenols; and substituted hydroquinones.

In an embodiment, the inventive composition further comprises at least one stabilizer. Suitable stabilizers include, but are not limited to, antioxidants and UV stabilizers. In an embodiment, the stabilizer is present in an amount from 0.05 to 20 wt %, based on the weight of the inventive composition.

In an embodiment, the inventive composition further comprises at least one flame retardant. Illustrative flame retardants include, but are not limited to, aluminum hydroxide and magnesium hydroxide.

In an embodiment, an inventive composition further comprises a thermoplastic polymer. Illustrative polymers, include, but not limited to, propylene-based polymers, ethylene-based polymers, and olefin multi-block interpolymers. Suitable ethylene-base polymers include, but are not limited to, high density polyethylene (HDPE), linear low density polyethylene (LLDPE), very low density polyethylene (VLDPE), ultra low density polyethylene (ULDPE), homogeneously branched linear ethylene polymers, and homogeneously branched substantially linear ethylene polymers (that is homogeneously branched long chain branched ethylene polymers).

Illustrative blowing agents include, but are not limited to, inorganic blowing agents such as sodium bicarbonate and sodium carbonate; and organic blowing agents, for example, nitroso compounds such as N,N'-dinitrosopentamethylenetetramine and N,N'-dinitrosoterephthalamide; azo compounds such as azodicarbonamide, azobisisobutyronitrile, and barium azodicarboxylate; hydrazide compounds such as benzenesulfonyl hydrazide and 4,4'-oxybis(benzenesulfonyl hydrazide); and azide compounds such as calcium azide, 4,4'-diphenyldisulfonyl azide, 4,4 oxybenzene sulfonyl semi carbazide, and p-toluene sulfonyl semi carbazide; among others, and combinations thereof.

Applications

The compositions of the present invention may be used to prepare a variety of articles or manufacture, or their component parts or portions. The inventive compositions may be converted into a finished article of manufacture by any one of a number of conventional processes and apparatus. Illustrative processes include, but are not limited to, extrusion, calendering, compression molding, and other typical thermoset material forming processes. Articles include, but are not limited to, sheets, foams, molded goods, and extruded parts. Additional articles include automotive parts, weather strips, belts, hoses, building profiles, wire and cable jacketing, flooring materials, gaskets, tires and tire components, computer parts, building materials and footwear components. A skilled artisan can readily augment this list without undue experimentation. The inventive compositions are especially suitable for use as foams for automotive sealants. For example, an inventive composition can be used for a door sealant, for example, a primary door sealant, to insulate the cabin from air and water entry. A primary door sealant must have good surface quality, high collapse resistance, good tensile strength, low foam density, and low water absorption.

Definitions

Unless stated to the contrary, implicit from the context, or customary in the art, all parts and percents are based on weight, and all test methods are current as of the filing date of this disclosure. For purposes of United States patent practice, the contents of any referenced patent, patent application or publication are incorporated by reference in their entirety (or its equivalent US version is so incorporated by reference) especially with respect to the disclosure of synthetic techniques, product and processing designs, polymers, catalysts, definitions (to the extent not inconsistent with any definitions specifically provided in this disclosure), and general knowledge in the art.

"Composition" and like terms, as used herein, means a mixture or blend of two or more materials which comprise the composition, as well as reaction products and decomposition products formed from the materials of the composition.

"Comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

The term "polymer," as used herein, refers to a polymeric compound prepared by polymerizing monomers, whether of the same or a different type. The generic term polymer thus embraces the term homopolymer (employed to refer to polymers prepared from only one type of monomer, with the understanding that trace amounts of impurities can be incorporated into the polymer structure) and the term interpolymer as defined hereinafter. Trace amounts or impurities, such as catalyst residues, can be incorporated into and/or within the polymer. "Interpolymer" and like terms, as used herein, mean a polymer prepared by the polymerization of at least two different types of monomers. The generic term interpolymer thus includes copolymers (employed to refer to polymers prepared from two different types of monomers), and polymers prepared from more than two different types of monomers (e.g., terpolymers (three different monomer types) and tetrapolymers (four different monomer types)).

"Ethylene-based polymer" and like terms, as used herein, refers to a polymer that comprises, in polymerized form, 50 wt % or a majority weight percent of ethylene monomer (based on the weight of the polymer), and optionally may comprise one or more comonomers).

"Ethylene/α-olefin/nonconjugated polyene interpolymer" and like terms, as used herein, refers to a polymer that comprises, in polymerized form, ethylene, an α-olefin, and a nonconjugated polyene. In one embodiment, the "ethylene/α-olefin/nonconjugated polyene interpolymer" comprises a majority weight percent of ethylene (based on the weight of the interpolymer).

"Ethylene/α-olefin/diene interpolymer" and like terms, as used herein, refers to a polymer that comprises, in polymerized form, ethylene, an α-olefin, and a diene. In one embodiment, the "ethylene/α-olefin/diene interpolymer" comprises a majority weight percent of ethylene (based on the weight of the interpolymer).

"Ethylene/α-olefin olefin/diene terpolymer" and like terms, as used herein, refers to a polymer that comprises, in polymerized form, ethylene, an α-olefin, and a diene, as the only monomer types. In one embodiment, the "ethylene/α-olefin/diene terpolymer" comprises a majority weight percent of ethylene (based on the weight of the terpolymer).

Test Methods

Mooney Viscosity

Mooney Viscosity (ML1+4 at 125° C.) of the interpolymer (e.g., ethylene/α-olefin/nonconjugated polyene interpolymer, was measured in accordance with ASTM 1646-04, using a large rotor, with a one minute preheat time and a four minute rotor operation time. The instrument was an Alpha Technologies Mooney Viscometer 2000.

Conventional Gel Permeation Chromatography (Conv. GPC)

A PolymerChar (Valencia, Spain) high temperature Gel Permeation Chromatography system consisting of an Infrared concentration/composition detector (IR-5), a PDI 2040 laser light scattering (Precision Detector, now Agilent) and a four capillary bridge viscometer (Viscotek, now Malvern) was used for MW and MWD determination. The carrier solvent was 1,2,4-trichlorobenzene (TCB). The solvent delivery pump, the on-line solvent degasser, auto-sampler, and column oven were from Agilent. The auto-sampler and detector compartments were operated at 160° C., and the column compartment was operated at 150° C. The columns were four PLgel Mixed-A LS, 20 micron columns (Agilent). The chromatographic solvent and the sample preparation solvent contained 250 ppm of butylated hydroxytoluene (BHT) and both solvent sources were nitrogen sparged. Polymer samples were prepared at targeted concentrations of 2 mg/mL by weighing samples via a computer controlled balance, and delivering calculated amount of solvent via an autosampler system. Samples were dissolved at 160° C. for 2 hour with gentle agitation. The injection volume was 200 μl, and the flow rate was 1.0 mL/minute.

Calibration of the GPC column set was performed with 21 narrow molecular weight distribution polystyrene standards. The molecular weights of the standards ranged from 580 to 8,400,000 g/mol, and were arranged in 6 "cocktail" mixtures, with at least a decade of separation between individual molecular weights. The polystyrene standard peak molecular weights were converted to polyethylene molecular weights using the following equation (as described in Williams and Ward, J. Polym. Sci., Polym. Let., 6, 621 (1968)): $M_{PE}=A\times(M_{PS})^B$ (Eq. 1), where M is the molecular weight, A has an experimental value of ~0.42 which was determined using a Dow linear reference with known molecular weight, and B equals 1. A logarithmic molecular weight calibration is generated using a fifth-order polynomial fit as a function of elution volume. A flow rate marker of diluted decane in TCB was used to linearly correct the flow rate for all samples.

The mass detector constant, laser light scattering detector constant, and the viscometer detector constant were determined using a Dow internal linear HDPE reference with known value of the weight average molecular weight (120,000 g/mol, dn/dc=−0.104 mL/g) and intrinsic viscosity (1.873 dL/g). The chromatographic concentrations were assumed low enough to eliminate addressing 2nd Virial coefficient effects (concentration effects on molecular weight).

The Systematic Approach for the determination of detector offset was implemented in a manner consistent with that published by Balke, Mourey, et. al. (Mourey and Balke, Chromatography Polym. Chpt 12, (1992)) (Balke, Thitiratsakul, Lew, Cheung, Mourey, Chromatography Polym. Chpt 13, (1992)), using data obtained from the two detectors while analyzing the Dow reference of the broad linear polyethylene homopolymer (120,000 g/mol) and the narrow polystyrene standards. The Systematic Approach was used to optimize each detector offset to give molecular weight results as close as possible to those observed using the conventional GPC method.

The absolute weight average molecular weight Mw of samples, were characterized by the LS detector and IR-5 concentration detector using following equation:

$$Mw(\text{abs}) = K_{LS} * \frac{\sum (LS_i)}{\sum (IR_i)}, \quad \text{(Eq. 2)}$$

where, $\Sigma(LS_i)$ is the response area of LS detector, $\Sigma(IR_i)$ is the response area of IR-5 detector, and $K_{LS}$ is the instrument constant which was determined using the Dow internal reference with known concentration and the weight average molecular weight of 120,000 g/mol. The absolute molecular weight of each elution volume was calculated by following:

$$M_{LS,i} = K_{LS} * \frac{LS_i}{IR_i}. \quad \text{(Eq. 3)}$$

The intrinsic viscosity of samples, were characterized by the viscometer detector and IR-5 concentration detector using following equation:

$$IVw = K_{IV} * \frac{\sum (DV_i)}{\sum (IR_i)}, \quad \text{(Eq. 4)}$$

where, $\Sigma(DV_i)$ is the response area of viscometer detector, $\Sigma(IR_i)$ is the response area of IR-5 detector, and $K_{IV}$ is the instrument constant which was determined using the Dow internal reference with known concentration and the intrinsic viscosity of 1.873 dL/g). The intrinsic viscosity of each elution volume was calculated by following:

$$IV_i = K_{IV} * \frac{DV_i}{IR_i}. \quad \text{(Eq. 5)}$$

The g' value is calculated as follows: $g_i' = (IV_{Sample,i} / IV_{linear\ reference,i})$ (Eq. 6), where the $IV_{linear\ reference,i}$ is calculated using the absolute molecular weight of the sample and the Mark-Houwink Plot of the Dow linear reference. The g' of the sample is calculated as following:

$$g' = \frac{\sum (IR_i * g_i')}{\sum (IR_i)}. \quad \text{(Eq. 7)}$$

FTIR Method for EPDM Composition Analysis

The terpolymers containing ethylene, propylene, and 5-ethylidene-2-norbornene were analyzed using ASTM D3900 for its ethylene content, and ASTM D6047 for its ethylidene-norbornene or dicyclopentadiene content.

13C NMR Method for EPDM Composition Analysis and Tacticity (% mm)

The samples were prepared by adding approximately "2.6 g" of a "50/50 mixture of tetrachloroethane-d2/orthodichlorobenzene" that is "0.025M" in chromium acetylacetonate (relaxation agent) to "0.2 g sample" in a 10 mm NMR tube. The samples were dissolved, and homogenized, by heating the tube and its contents to 150° C. The data were collected using a Bruker 400 MHz spectrometer, equipped with a Bruker Dual DUL high-temperature CryoProbe. The data was acquired using "160 scans per data file," a six second pulse repetition delay, with a sample temperature of 120° C. The acquisition was carried out using a spectral width of 25,000 Hz and a file size of 32K data points.

NMR spectral analysis of each composition of the examples was carried out using the following analysis method. Quantitation of monomers present in EPDM can also be calculated using the following equations (1 through 9). The calculation of moles ethylene normalizes the spectral range from 55.0 to 5.0 ppm to 1000 integral units. The contribution under the normalized integral area only accounts for 7 of the ENB carbons. The ENB diene peaks at 111 and 147 ppm are excluded from the calculation due to concerns that double bonds may react at high temperatures.

$$molesEth = \frac{(1000 - 3*molesP - 7*molesENB)}{2}; \quad \text{Equation 1}$$

$$molesENB = CH3(13.6 - 14.7\ ppm); \quad \text{Equation 2}$$

$$molesP = CH3(19.5 - 22.0\ ppm); \quad \text{Equation 3}$$

$$\text{mole \% ethylene} = \frac{100*molesE}{molesE + molesP + molesENB}; \quad \text{Equation 4}$$

$$\text{mole \% propylene} = \frac{100*molesP}{molesE + molesP + molesENB}; \quad \text{Equation 5}$$

$$\text{mole \% ENB} = \frac{100*molesENB}{molesE + molesP + molesENB}; \quad \text{Equation 6}$$

$$\text{Wt \% ethylene} = \frac{100*\text{moles \%}\ E*28}{\text{mole \%}\ E*28 + \text{mole \%}\ P*42 + \text{mole \%}\ ENB*120}; \quad \text{Equation 7}$$

$$\text{Wt \% propylene} = \frac{100*\text{mole \%}\ P*42}{\text{mole \%}\ E*28 + \text{mole \%}\ P*42 + \text{mole \%}\ ENB*120}; \quad \text{Equation 8}$$

$$\text{Wt \% ENB} = \frac{100*\text{mole \%}\ ENB*120}{\text{mole \%}\ E*28 + \text{mole \%}\ P*42 + \text{mole \%}\ ENB*120}. \quad \text{Equation 9}$$

Propylene Tacticity % Mm Area 13C NMR

13C NMR spectral analysis of the EPDMS to quantitate the level of tacticity % mm was performed in a "50/50 mixture of tetrachloroethane-d2/orthodichlorobenzene," as described above.

An NMR spectral analysis (see above) of the inventive EPDMs displayed a peak area from 21.3-21.8 ppm greater than 3.5% of the total integral area from 19.5 to 22.0 ppm. Similar spectral analysis of the comparative EPDMs showed less than 3.5% of the total integral area from 19.5 to 22.0 ppm. Spectral data were referenced to the EEE backbone at 30 ppm. Peak responses in this region typically are related to differences in propylene tacticity (% mm) that have been incorporated into the EPDM. A similar analysis can be done for another type of ethylene/α-olefin/nonconjugated polyene interpolymer.

Dynamic Mechanical Spectroscopvy (DMS)

Small angle oscillatory shear (melt DMS) was performed using a TA Instruments ARES, equipped with "25 mm parallel plates," under a nitrogen purge. The time between sample loading, and beginning of the test, was set to five minutes for all samples. The experiments were performed at 190° C., over a frequency range from 0.1 to 100 rad/s. The strain amplitude was adjusted, based upon the response of the samples, from 1 to 3%. The stress response was analyzed in terms of amplitude and phase, from which, the storage modulus (G'), loss modulus (G"), dynamic viscosity $\eta^*$, and tan delta were calculated. Specimens for Dynamic Mechanical Spectroscopy were "25 mm diameter×3.3 mm thick" compression molded discs, formed at 180° C., and 10 MPa molding pressure, for five minutes, and then quenched between chilled platens (15-20° C.) for two minutes. The rheology ratio of the viscosity at 0.1 rad/sec to the viscosity at 100 rad/sec (V0.1/V100 at 190° C.; also referred to as "RR") was recorded. A linear molecule (no detectable long chain branching) typically has a RR of 8 or less. It is acknowledged that the presence oil in the polymer can decrease the observed RR, so the following equation was used to estimate the RR of a polymer ($RR_{Polymer}$) from the RR value of a polymer containing oil ($RR_{OE\_Polymer}$): $RR_{Polymer} = RR_{OE\_Polymer}/(\text{wt \% oil}*(-0.01988)+1.0321)$.

Compression Set

Compression set was measured according to ASTM D395 at 23° C. and 100° C. Disks of "29 mm (±0.5 mm)" in diameter and "12.7 (±0.5 mm)" thickness were punched from compression molded plaques, prepared as described under the section of compression molding (see Experimental section). Each button sample was inspected for notches, uneven thickness and inhomogeneity, and selected buttons (without those defects) were tested. Compression set was performed on two specimens for each sample, at the temperatures specified, and the average of the two specimens reported. The button sample was placed in the compressive device having two metal plates, which could be pressed together, and locked into place at 75% of the original height of the button sample. The compressive device, with the compressed samples, was then placed in an oven, and equilibrated at the appropriate temperature for a specified time (22 hrs for 23° C. or 100° C.). In this test, the stress was released at the test temperature, and the thickness of the sample was measured after 30 minute equilibration period at room temperature. Compression set is a measured of the degree of recovery of a sample following compression, and is calculated according to the equation CS=(H0–H2)/(H0–H1); where H0 is the original thickness of the sample, H1 is the thickness of the spacer bar used, and H2 is the final thickness of the sample after removal of the compressive force.

Tensile Stress-Strain Properties

Tensile properties were measured using specimens which were die cut using a small dog bone shaped micro tensile die, having the dimensions described in ASTM D-1708. The die cut specimens were cut from the compression molded plaques which were prepared as described under the compression molding section (see the Experimental section). Tensile properties (tensile strength and elongation) were measured, at room temperature, following the method ASTM D-412, in the machine direction of an INSTRON MODEL 1122, made by INSTRU-MET.

Specific Gravity

The specific gravity of the foamed samples was measured in accordance to ASTM D792.

Water Absorption by Vacuum Method (Change in Mass)

The determination of the water absorption was measured in accordance to ASTM D1056. This test method determines the water absorption properties of closed cell foam by measuring the change in weight (mass) after a specified immersion period. This test method is indirectly a measure of the sample's cell structure/closed cell content.

Cured foam samples were conditioned room for at least 1 day. The thermometer inside the vacuum oven cavity was maintained at reading room prior to testing. Cured foam samples were cut into 1" rods or 1" strips. Three sets of 1" sections were cut per sample. Each sample was weighed to 3 decimal places, and its Initial Weight recorded. A plastic container containing deionized water was used to submerge the samples. A plastic mesh was placed over the mouth of the plastic container, and the samples were down onto the mesh, until the plastic mesh touched the bottom of the container. The samples were at least 2" below the surface of the water. The sample container was placed in vacuum oven (VWR Oven Model 1410), and a vacuum was applied, and reduce the to 25 in Hg. The timing for the test was begun as soon as the "25 in/Hg" vacuum was reached. The vacuum pump was turned off after three minutes. The oven cavity was returned to atmospheric pressure by turning the pump off and venting the oven chamber to the atmosphere. The container remained in the oven for another three minutes, before the samples were removed from the plastic container. Excess surface water was removed from each sample before weighing the tested samples. Each tested sample was weighed as quickly as possible to avoid water loss by evaporation, and its Final Weight was recorded. The percent change in mass was calculated as follows:

$$W = \left[\frac{(A-B)}{B} \times 100\right],$$

where W=change in mass, %; A=final mass of specimen in air, g; and B=initial mass of specimen in air, g.

Uniaxial Extensional Characterization by Extensional Viscosity Fixture (EVF)

Transient uniaxial elongational viscosity is measured by means of the extensional viscosity fixture, EVF, connected to a rotational rheometer ARES by TA Instruments. A flat rectangular shaped sample of approximately 0.8 mm thickness, 10 mm width and 18 mm length is stretched at a constant extension rate between two parallel cylinders, with a center to center distance of $L_0$=12.7 mm. The details of the mechanism of rotation of the cylinders are described in Franck, Aly, "The ARES-EVF: Option for measuring extensional viscosity of polymer melts," TA Instruments Report PNO02 (2005) (http://www.tainstruments.com/wp-content/uploads/APN002_V2_ARES_EVF_to_measure_elongation_viscosity.pdf).

The nominal Hencky strain rate is defined as:

$$\dot{\varepsilon} = \frac{2\Omega R}{L_0}, \qquad (1)$$

where, R is the radius of cylinders and omega their angular velocity. The measured torque, T(t), and the extensional force, F(t), are related by the equation, T(t)=2RF(t) (2). The extensional viscosity is calculated as, $$\eta_E(t) = \frac{\sigma_E(t)}{\dot{\varepsilon}}, \qquad (3)$$

where $\sigma_E$ is the extensional stress defined as, $$\sigma_E(t) = \frac{F(t)}{A(t)}, \qquad (4)$$

and the instantaneous area is given by the equation, $$A(t) = A_0 \left(\frac{\rho_{SOLID}}{\rho_{MELT}}\right)^{\frac{3}{2}} e^{-\varepsilon(t)}, \qquad (5)$$

where $A_0$ is the initial area of the sample, $\rho$ is the polymer density as solid and melt, and $\varepsilon=\dot{\varepsilon}t$ is the Hencky strain.

Samples are pre-stretched at a constant rate of 0.005 s$^{-1}$ to compensate for the thermal expansion from room temperature to the test temperature. The instrument software, Orchestrator, calculates the pre-stretch length and time automatically. The densities used are 0.922 g/cm³ at room temperature, and 0.762 g/cm³ at 150° C. A relaxation time of 60 s is allowed after the pre-stretch step and right before the extensional viscosity measurements. Tests are performed at 150° C. and a constant extension rate of 10 s$^{-1}$.

Two parameters are reported from EVF test at $\dot{\varepsilon}$=10 s$^{-1}$, the maximum Hencky strain, and extensional viscosity ratio calculated with equation:

$$EVR = \frac{\eta_E^+(t=0.01, \dot{\varepsilon})}{\eta_E^+(t, \dot{\varepsilon})}, \qquad (6)$$

where $\eta_E$ is the extensional viscosity measured at t=0.01 s, and at time t when rupture of the sample occurs.

Melt Strength by GOETTFERT RHEOTENS Device

Melt strength measurements were performed on a RHEOTENS device connected in series with a capillary rheometer RHEOTESTER 2000. Pellets were compressed-packed manually into a 12 mm diameter barrel to load a bubble free sample into the capillary rheometer. The soak time after packing is 10 min at the test temperature of 190° C. A polymer strand was extruded at a shear rate of 38.2 s$^{-1}$, with a capillary die of 30 mm length, 2 mm diameter and 180° entrance angle. The strand was extended by a pair of counter rotating wheels with a speed defined by the acceleration factor a=2.4 mm/s$^2$. The initial speed of the wheels was adjusted to measure a starting force approximately equal to zero. The resistance of the material against drawdown is recorded in an extension plot of force, F, versus drawdown velocity, v. The test ends with the rupture of the strand. Melt strength is reported as the maximum force at beak, or as the average pull force calculated with the last 40 recorded data points if a plateau is obtained before breakage of the strand. Extensibility is the maximum velocity measured at rupture.

EXPERIMENTAL

I. Representative Synthesis of First Composition (FC EPDM 1 and FC EPDM 2) Continuous Polymerization The inventive first compositions were produced by a continuous solution polymerization process using a CSTR followed by a loop reactor. Ethylene was introduced in a mixture of a solvent of ISOPAR E (a mixture of C8 to C10 saturated hydrocarbons available from ExxonMobil), propylene and 5-ethylidene-2-norbornene (ENB), forming the reactor feed stream. Same catalyst was fed to the reactor separately and activated in-situ using co-catalyst 1 and co-catalyst 2. The outlet of the reactor was consequently a mixture of polymer, solvent, and reduced levels of the initial monomer streams. The molecular weight of the polymer may be controlled by adjusting reactor temperature, monomer conversion and/or the addition of a chain terminating agent such as hydrogen. The polymerization reactions were performed under steady state conditions, that is, constant reactant concentration and continual input of solvent, monomers, and catalyst, and withdrawal of unreacted monomers, solvent and polymer. The reactor system was cooled and pressured to prevent formation of a vapor phase. Reactor product from first reactor was transferred to second reactor, and more catalyst added to second reactor.

Catalyst 1 {[[[2',2""-[1,3-propanediylbis(oxy-kO)]bis[3-[3,6-bis(1,1-dimethylethyl)-9H-carbazol-9-yl]-5'-fluoro-5-(1,1,3,3-tetramethylbutyl)[1,1'-biphenyl]-2-olato-kO]](2-)]-hafniumdimethyl} was fed to the reactor separately, and activated in-situ using co-catalyst 1 and co-catalyst 2. Cocatalyst-1 was a mixture of methyldi(C$_{14-18}$ alkyl)ammonium salts of tetrakis(pentafluorophenyl)borate, prepared by reaction of a long chain trialkylamine (ARMEEN M2HT, available from Akzo-Nobel, Inc.), HCl and Li[B(C$_6$F$_5$)$_4$], substantially as disclosed in U.S. Pat. No. 5,919,988 (Ex. 2). Cocatalyst-1 was purchased from Boulder Scientific, and used without further purification. Cocatalyst-2 (modified methylalumoxane (MMAO)) was purchased from Akzo Nobel, and used without further purification.

After polymerization, a small amount of water was introduced into the reactor exit stream (outlet stream) as a catalyst kill, and the reactor exit stream was introduced into a flash vessel, in which the solids concentration was increased by at least 100 percent. A portion of the unreacted monomers, that is, ENB, ethylene, and propylene, and the unused diluent were then collected, and recycled back to the reactor feeds as appropriate. Also in some cases, extender oil (e.g., PARALUX 6001) was injected after the reactor exit stream and added in the specified amount. The outlet stream of the reactor was consequently a mixture of polymer, solvent, and reduced levels of the initial monomer streams. The product stream was then heated by passing through a heat exchanger before devolatilization. The polymer product was recovered by extrusion using a devolatilizing extruder and water cooled pelletizer.

Tables 1A and 1B summarize the reaction conditions used to produce some of the inventive examples. Reactor volume for the CSTR, equipped with an impeller, was 20.1 gal US, and the reactor volume for the loop reactor was 30.6 gal. The options for consecutive reactor configurations are flexible; single mode operation of loop or CSTR and consecutive reactor operation of loop-CSTR, CSTR-loop etc. Table 2 A summarizes the properties of the experimental first interpolymers made for this study. Table 2B summarizes the properties of the experimental first compositions made for this study. Table 3 summarizes the properties of some of the comparative first compositions (commercial resins).

Inventive interpolymers were produced by a solution polymerization process which used a difference in ethylene conversion and reactor temperature between first and second reactors. Different process conditions were used in the first and second reactors for converting 50% of the ethylene at a relatively low temperature (100° C.) in the first reactor to produce high molecular weight and linear polymers, and for converting 80% of the ethylene at a higher temperature (160° C.) in the second reactor to produce lower molecular weight branched polymer chains. In addition, to push the molecular weight of the polymer chains in the first reactor higher, nearly zero of the termination agent (hydrogen) was sent to the first reactor. Effectively, the reactors were able to produce two vastly different environments for the same catalyst to build polymer chains, while at the same time maintaining the desired comonomer and termonomer incorporation. Using a single catalyst in both reactors versus a dual catalyst package greatly simplifies the reactor control to achieve the desired product.

Tan Delta (First Composition or First Interpolymer)

Figure 1:
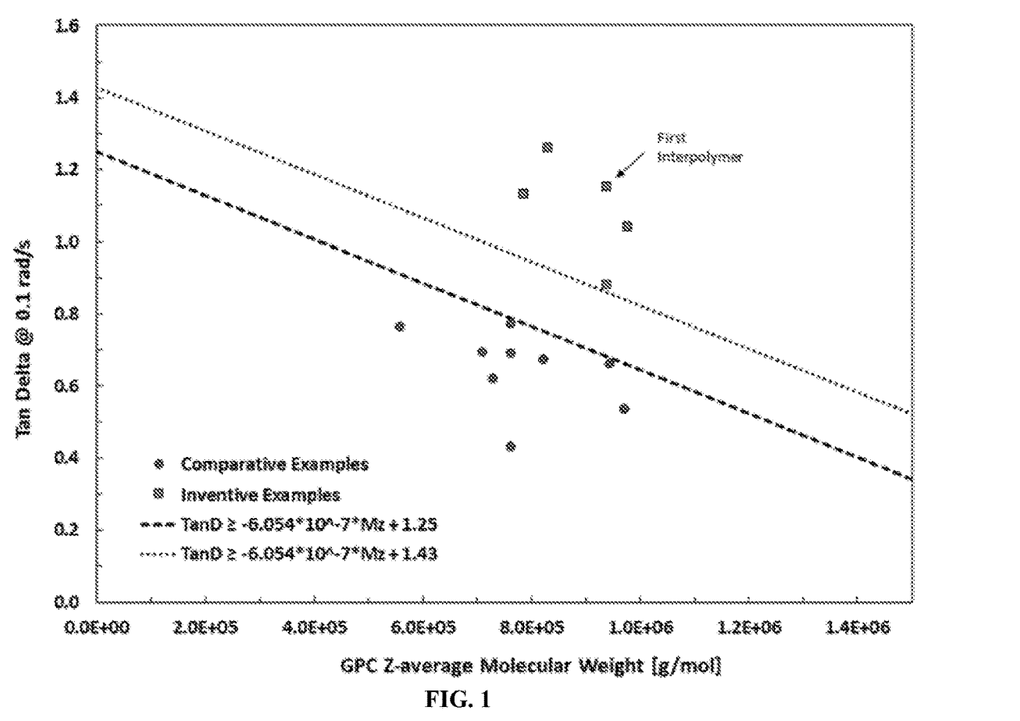
FIG. 1 depicts a plot of the Tan Delta (TD) (0.1 rad/s) versus Mz-average molecular weight (g/mol) for a first interpolymer (indicated by the arrow), and inventive and comparative first compositions.
Figure 2:
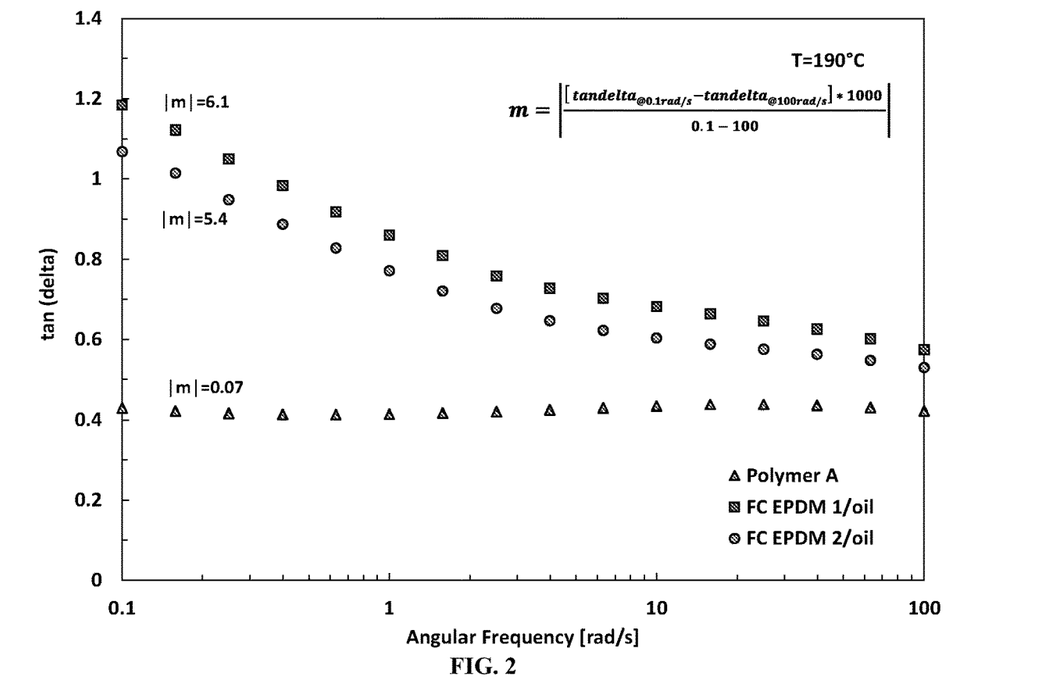
FIG. 2 depicts the tan delta at 0.1 rad/s versus angular frequency (rad/s) of two inventive first compositions and a comparative first composition.

FIG. 1 depicts a plot of the Tan Delta (TD) (0.1 rad/s) versus GPC Z-average molecular weight (g/mol) for a first interpolymer (indicated by the arrow), and inventive (first) compositions and comparative compounds. For this figure, the data for the first interpolymer is the values for EPDM-1 or EPDM-2 from Table 2A, the data for the inventive (first) compositions is listed in Table 2B, and the data for the comparative compounds is listed in Table 3. For the two inventive examples of the first composition made with oil (FC EPDM1/oil and FC EPDM2/oil) in Table 2B, the average tan delta was used in FIG. 1.

Overall, the TD slope and Tan Delta 0.1 versus GPC Z Mz comparison of the inventive examples indicate that the branching topology is very different than the comparative examples and is more linear in nature to result in higher Tan Delta values for its Z-average molecular weight. The linear, high molecular weight fraction (Mz) design reported in this invention contrasts with the highly branched character, and sometimes lower Mz of existing polymers participating in this application space.

TABLE 1A

Reaction Conditions for Experimental First Composition (CSTR (Rx1) followed by Loop Reactor (Rx2))

| | H2 (mol %)[A] | | C2 Conc. (g/L) | | Catalyst Efficiency* (lb. poly/ lb. metal) * 10E6 Catalyst A | | Catalyst Flow* (lb/hr) Catalyst | | Catalyst Solution Concen- tration (ppm) | | Cocat-1** Flow (lb/hr) | |
|---|---|---|---|---|---|---|---|---|---|---|---|---|
| | Rx1 | Rx2 | Rx1 | Rx2 | Rx1 | Rx2 | Rx1 | Rx2 | Rx1 | Rx2 | Rx1 | Rx2 |
| FC EPDM 1 | 0.00 | 0.49 | 18.43 | 15.22 | 0.82 | 0.90 | 0.86 | 1.51 | 29.91 | 29.91 | 0.34 | 0.61 |
| FC EPDM 2 | 0.00 | 0.38 | 18.40 | 14.07 | 0.92 | 0.59 | 0.85 | 2.30 | 29.91 | 29.91 | 0.43 | 0.91 |

| | Cocat-1 Solution Conc. (ppm) | | Cocat-2*** Flow (lb/hr) | | Cocat-2 Solution Conc. [ppm] | | Production Rate**** [lb/hr] | |
|---|---|---|---|---|---|---|---|---|
| | Rx1 | Rx2 | Rx1 | Rx2 | Rx1 | Rx2 | Rx1 | Rx2 |
| FC EPDM 1 | 999.97 | 999.97 | 0.24 | 0.42 | 498.03 | 498.03 | 21.26 | 40.46 |
| FC EPDM 2 | 999.97 | 999.97 | 0.23 | 0.62 | 498.03 | 498.03 | 23.35 | 40.42 |

[A]The mole % H2 is relative to the total reactant monomer feed to produce the polymer (C2, C3, ENB).
*Catalyst: [[2',2'''-[1,3-propanediylbis(oxy-kO)]bis[3-[3,6-bis(1,1-dimethylethyl)-9H-carbazol-9-yl]-5'-fluoro-5-(1,1,3,3-tetramethylbutyl)[1,1'-biphenyl]-2-olato-kO]](2-)]-hafnium dimethyl
**Cocatalyst-1 was a mixture of methyldi(C14-18 alkyl)ammonium salts of tetrakis(pentafluorophenyl)borate, prepared by reaction of a long chain trialkylamine (ARMEEN M2HT, available from Akzo-Nobel, Inc.), HCl and Li[B(C6F5)4], substantially as disclosed in U.S. Pat. No. 5,919,988 (Ex. 2). Cocatalyst-1 was purchased from Boulder Scientific, and used without further purification.
***Cocatalyst-2 (modified methylalumoxane (MMAO)) was purchased from Akzo Nobel, and used without further purification.
****The weight ratio of first interpolymer to second interpolymer is 35/65.

TABLE 1B

Reaction Conditions for Experimental First Composition (CSTR (Rx1) followed by Loop Reactor (Rx2))

| | Reactor Temp. (° C.) | | Pressure (psig) | | Solvent Feed (lb/hr) | | Ethylene Feed (lb/hr) | | Propylene Feed (lb/hr) | | ENB Feed (lb/hr) | | % C2 Conversion | | Reactor Configuration | |
|---|---|---|---|---|---|---|---|---|---|---|---|---|---|---|---|---|
| | Rx1 | Rx2 | Rx1 | Rx2 | Rx1 | Rx2 | Rx1 | Rx2 | Rx1 | Rx2 | Rx1 | Rx2 | Rx1 | Rx2 | Rx1 | Rx2 |
| FC EPDM 1 | 100.78 | 161.48 | 662.00 | 649.48 | 232.31 | 108.53 | 18.43 | 15.22 | 21.30 | 25.04 | 7.50 | 3.21 | 50.84 | 76.07 | CSTR | LOOP |
| FC EPDM 2 | 101.03 | 162.54 | 664.76 | 649.84 | 228.20 | 116.80 | 18.40 | 14.07 | 21.49 | 15.54 | 7.65 | 0.71 | 51.87 | 84.61 | CSTR | LOOP |

TABLE 2A

Properties of First Interpolymer (sampled from first reactor and isolated polymer; each wt % based on weight of first interpolymer)

| First Inter- polymer | Mooney (ML1 + 4, 125° C.) | Oil | C2 | ENB | Mw (conv) | Mw/ Mn (conv) | Mz | g' | V0.1 rad/s, 190° C. | V0.1/ V100, 190° C. | Tan Delta @ 0.1 rad/s, 190° C. | Tan Delta @ 100 rad/s, 190° C. | m* (s/rad) | 13C NMR % Peak Area 21.3-21.8 ppm |
|---|---|---|---|---|---|---|---|---|---|---|---|---|---|---|
| Units | Mu | wt % | wt % | wt % | kg/mol | | kg/mol | | kPa-s | | | | | |
| EPDM 1 (RNX 1) | 80-120 | 0 | 56.6 | 9.3 | 439 | 2.73 | 939 | 0.863 | 725 | 100.3 | 1.15 | 0.22 | 9.3 | >15 |
| EPDM 2 (RNX 1) | 80-120 | 0 | 56.6 | 9.3 | 439 | 2.73 | 939 | 0.863 | 725 | 100.3 | 1.15 | 0.22 | 9.3 | >15 |

*Absolute of tan delta slope defined as: $m = \left| \dfrac{tandelta_{@0.1 rad/s} - tandelta_{@100 rad/s}}{0.1\ rad/s - 100\ rad/s} * 1000 \right|$.

TABLE 2B

Properties of Inventive First Compositions

| First Comp. | Mooney (ML1 + 4, 125° C.) | Oil | C2 | ENB | Mw (conv) | Mw/Mn (conv) | Mz (conv) | g' | V0.1 rad/s 190° C. | V0.1/V100, 190° C. | Tan Delta @ 0.1 rad/s, 190° C. | Tan Delta @ 100 rad/s, 190° C. | m* (s/rad) | 13C NMR % Peak Area 21.3-21.8 ppm |
|---|---|---|---|---|---|---|---|---|---|---|---|---|---|---|
| Units | Mu | wt %** | wt %*** | wt %*** | kg/mol | | kg/mol | | kPa-s | | | | | |
| FC EPDM 1 (no oil) | 68 | 0 | 55-56 | 9.8 | 264 | 4.95 | 978 | — | 214 | 67.9 | 1.04 | 0.52 | 5.2 | >15 |
| FC EPDM 2 (no oil) | 69 | 0 | 55-56 | 8.8 | 255 | 5.15 | 940 | 0.783 | 295 | 93.7 | 0.88 | 0.47 | 4.1 | >15 |
| FC EPDM 1/oil (with oil) | 30 | 20 | 55-56 | 8.9 | 246 | 4.53 | 832 | — | 74-83 | 46.5-51.9 | 1.33-1.18**** | 0.57 | 7.5 | >15 |
| FC EPDM 2/oil (with oil) | 34 | 20 | 55-56 | 9.1 | 237 | 4.45 | 786 | 0.749 | 99-107 | 58.4-66.4 | 1.19-1.06**** | 0.54 | 6.5 | >15 |

*Absolute of tan delta slope defined as: $m = \left| \dfrac{[tandelta_{@0.1rad/s} - tandelta_{@100rad/s}] * 1000}{0.1\ rad/s - 100\ rad/s} \right|$.

**Wt % based on weight of first composition.

***Wt % based on sum weight of first interpolymer and second interpolymer.

****The average Tan Delta value was 1.26 for FC EPDM 1/oil (with oil) and 1.13 for FC EPDM 2/oil, which values were used in FIG. 1.

TABLE 3

Properties of Comparative First Compositions (Commercial Resins)

| | MV @ 125 C. | Oil wt % | C2 % | ENB wt % | MW [kg/mol] | Mw/Mn | Mz [kg/mol] | g' | V0.1, 190° C. [kPa s] | V100, 190° C. [Pa s] | V0.1/V100 | TD0.1, 190° C. | TD100, 190° C. | Abs of TD Slope* | 13 C NMR % Peak Area 21.3-21.8 ppm |
|---|---|---|---|---|---|---|---|---|---|---|---|---|---|---|---|
| KELTAN 6251A Lanxess | 63 | 13.0 | 48 | 9 | 221 | 2.94 | 560 | — | 163 | 2.6 | 62.6 | 0.76 | 0.51 | 2.5 | <3.5 |
| VISTALON 8800 ExxonMobil | 75 | 13.0 | 54 | 10 | 266 | 4.08 | 945 | 0.691 | 196 | 2.4 | 82.7 | 0.66 | 0.52 | 1.3 | 1.2 |
| VISTALON 8600 ExxonMobil | 89 | 0.0 | 58 | 8.9 | 227 | 3.76 | 764 | — | 288 | 3.5 | 83.4 | 0.68 | 0.52 | 1.7 | 0.5 |
| KELTAN 9950 Lanxess | 90 | 0.0 | 60 | 9 | 246 | 3.49 | 730 | — | 256 | 3.5 | 74.4 | 0.62 | 0.50 | 1.2 | <3.5 |
| KEP 2480 Kumbo Polychem | 94 | 0.0 | 58 | 8.9 | 238 | 3.85 | 824 | 0.675 | 251 | 3.2 | 78.6 | 0.67 | 0.51 | 1.5 | <3.5 |
| ROYALENE 547 Lion Copolymer | 82 | 0.0 | 58 | 10 | 213 | 3.22 | 711 | — | 236 | 3.6 | 65.2 | 0.69 | 0.58 | 1.1 | <3.5 |
| EPT 8120E Mitsui | 85 | 14.5 | 56 | 9.5 | 233 | 5.08 | 764 | 0.624 | 386 | 2.3 | 167.6 | 0.42 | 0.4 | 0.1 | <3.5 |
| ESPRENE 7456 Sumitomo Chemical | 66 (150 C., 1 + 4) | 14.5 | 53 | 10.5 | 295 | 4.46 | 973 | — | 273 | 2.5 | 107.6 | 0.53 | 0.48 | 0.5 | <3.5 |
| EPDM07** | 51 | 21.9 | 48 | 7.8 | 284 | 3.47 | 763 | — | 157 | 2.2 | 70.1 | 0.77 | 0.43 | 3.4 | 23.2 |

*Abs of tandelta slope defined as: $m = \left| \dfrac{[tandelta_{@0.1rad/s} - tandelta_{@100rad/s}] * 1000}{0.1\ rad/s - 100\ rad/s} \right|$.

**See experimental section of WO2014/084892.

Extensional Rheology (First Composition)

Figure 3:
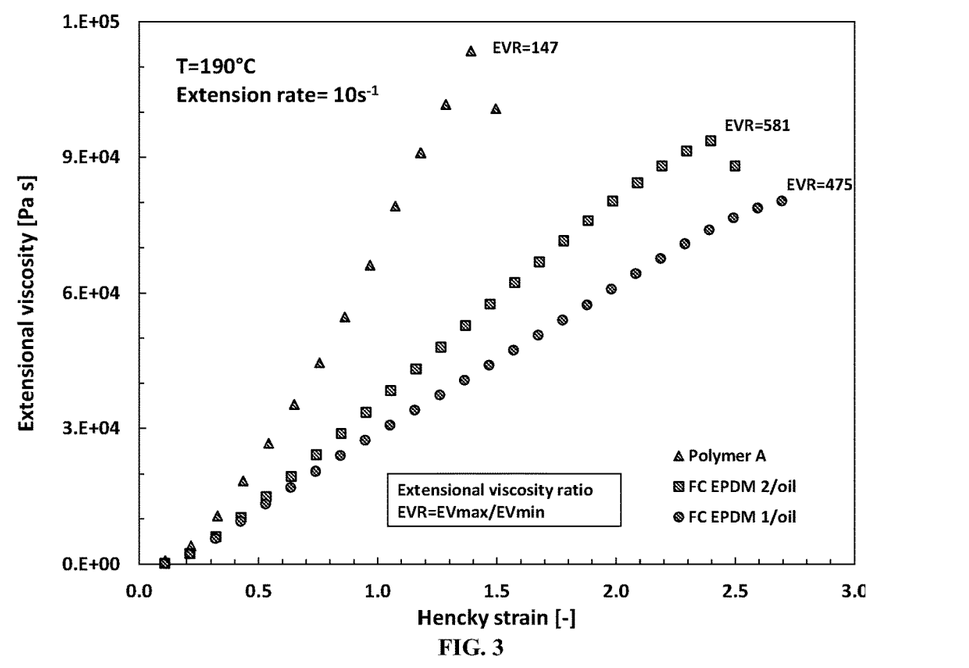
FIG. 3 depicts the "extensional viscosity versus Hencky strain" profiles of two inventive first compositions and a comparative first composition.

From elongational viscosity fixture (EVF) measurements, the elongational viscosity curve can be quantified by the elongational viscosity ratio (EVR) and maximum Hencky strain. EVR is defined as the ratio of the maximum elongational viscosity divided by the lowest measured elongational viscosity. For these measurements, the EVR is measured at 150° C. and 10 s$^{-1}$ extension rate. Table 4 (below) provides the Elongational Viscosity Fixture (EVF) data of the inventive (first) compositions and comparative compounds. FIG. 3 depicts the behavior of the inventive (first) compositions and comparative compounds under the EVF tests.

TABLE 4

EVF Data of Inventive and Comparative First Compositions

| | EVF at 10 s$^{-1}$ & 150° C. | | | |
|---|---|---|---|---|
| First Compositions | EVR (no unit) | EVmax (Pa-s) | EVmin (Pa-s) | Max Hencky strain (no unit) |
| FC EPDM 1/oil | 475 | 80314 | 169 | 2.7 |
| FC EPDM 2/oil | 581 | 93619 | 161 | 2.4 |
| Comparative Polymer A (EPT 8120E) | 147 | 113568 | 772 | 1.4 |

The EVR results show that the inventive FC EPDM 1/oil and FC EPDM 2/oil (first) compositions have a shallower EVR values of 581 and 475, respectively. The comparative example, Polymer A, shows an EVR value of 147. Physically, this indicates that the inventive examples develop a lower level of stress when extended, hence allowing the material to disentangle and reach a higher level of deformation as indicated by both the EVR and the maximum Hencky strain. Within the polymer structure, the observed result is the unique interaction of the linear and branched polymer chains that exist in the inventive examples, increasing its mobility and allowing them to disentangle and process easier. Note that extensional flow characterization is able to detect differences among these materials; their behavior can be attributed to the polymer architecture, chain mobility, and also the interaction of low and high molecular weight molecules.

Melt Strength (First Composition)

Figure 4:
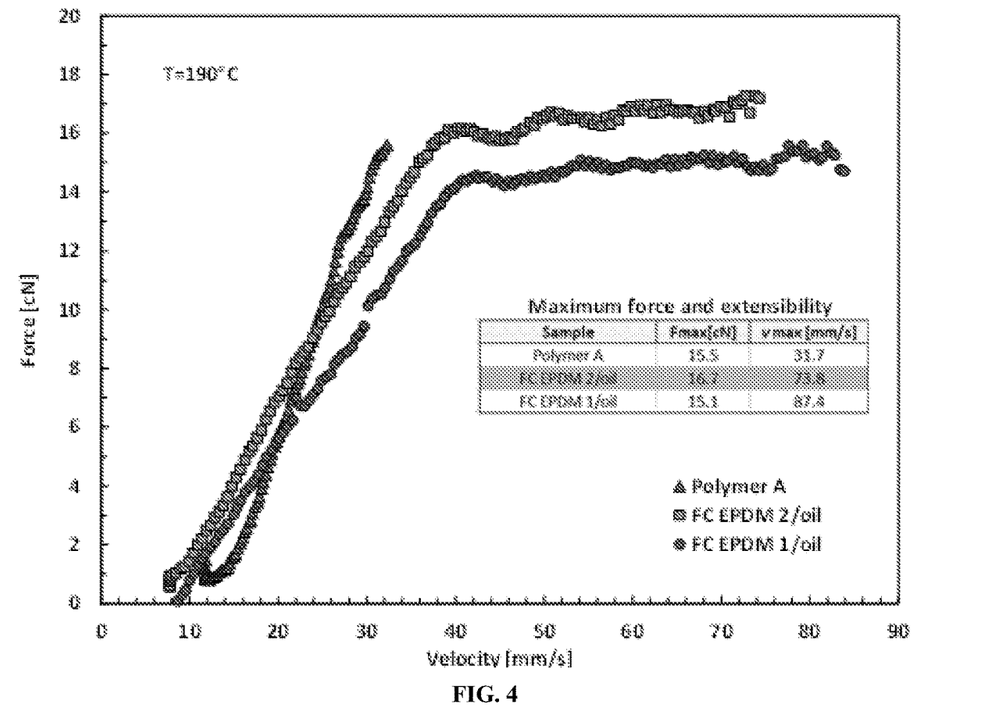
FIG. 4 depicts the melt strength profiles (force versus velocity) of two inventive first compositions and a comparative first composition.

From the melt strength measurements, the deformation behavior can be quantified by the maximum force and maximum velocity achieved during testing. The deformation of the material is an indicator of its elasticity related to its ability to stretch at a given extensional rate in the molten state. For these measurements, the melt strength is measured at 190° C. and at a constant acceleration rate of 2.4 mm/s2. Table 5 (below) provides the melt strength data of the inventive and comparison compositions. FIG. 4 compares the melt strength of the inventive and comparative EPDM compositions.

TABLE 5

Melt Strength of Inventive versus Comparative First Compositions

| | Melt Strength 190° C. | |
|---|---|---|
| First Compositions | Fmax [cN] | vmax [mm/s] |
| FC EPDM 2/oil | 16.7 | 73.8 |
| FC EPDM 1/oil | 15.1 | 87.4 |
| Comparative Polymer A (EPT 8120E) | 15.5 | 31.7 |

The melt strength results show that the inventive FC EPDM 2/oil and FC EPDM 1/oil (first) compositions have a maximum force of 16.7 and 15.1 cN, respectively and reaches a maximum velocity of 73.8 and 87.4 mm/s. The comparative example, Polymer A shows a similar maximum force (15.5 cN) but at a significantly lower velocity of 31.7 mm/s. Physically, this indicates that the inventive examples can be extended to greater velocities before breaking. Within the polymer structure, the observed result is from the unique interaction of the linear and branched polymer chains that exist in the inventive examples, increasing its mobility and allowing them to disentangle and stretch farther.

Note that extensional flow characterization is able to detect differences among these materials; their behavior can be attributed to the polymer architecture, chain mobility, and also the interaction of low and high molecular weight molecules. Overall and uniquely, the inventive EPDM 01 and EPDM 02 (first) compositions have higher melt strength and it is hypothesized in the presence of a blowing agent, the foamed cells would expand more freely. In combination of having a high diene level, it is expected that the cell growth can be controlled to result in a bubble size distribution and closed-bubble cell structure that is improved over the highly branched, less extensible polymer (Polymer A). Other improvements in compounding and mixing may be observed due to the less elastic nature and higher extensibility of the inventive examples, allowing the material to flow and incorporate the compound ingredients with lower shear forces.

II. Formulations (Compound Mixing)

To evaluate polymer performance, both the inventive and comparative (first) compositions were compounded with the additives shown in Table 6. The rubber curing package contained sulfur accelerators, carbon black, inorganic fillers, zinc oxide, oil, activators and stabilizers, with and without a blowing agent. The specific non-foam formulations are shown in Table 6 represent the "first pass" compositions. The inventive (first) compositions contained EPDM 01 or EPDM 02, each with oil. The comparative example also contained oil.

Mixing was performed in two steps (first pass and second pass). Temperature sensitive additives were added in the second pass. The inventive and comparative "first pass" compositions were prepared using an upside down method where filler, oil and carbon black were added to a 1.5 L Farrell Banbury followed by polymer addition (75% fill factor) and mixing at a rotor speed of 50 rpm. The mixer was equipped with a 2 wing tangential rotor and mixing time was 3 minutes. The "second pass composition" was performed next day by mixing the first pass compound and the curatives for approximately 3 min mixing (about 80 C dropping temp) at 30 rpm. Mixing was completed on a 6" 2 roll mill and the compound was sheeted to prepare blankets out for mechanical testing. Results (Mooney (ML (1+4) 125° C.)) are shown in Table 8.

TABLE 6

First Pass Compositions - non-foam formulations
(amounts in phr, based on total weight of first composition)

| | Example | | |
|---|---|---|---|
| | Comp. 1 Comparative Polymer A (EPT 8120E) | Inv. 1 FC EPDM 1/oil | Inv. 2 FC EPDM 2/oil |
| AMT of FC (including oil), | 120 (100 phr FC | 120 (100 phr FC plus) | 120 (100 FCphr |

TABLE 6-continued

First Pass Compositions - non-foam formulations
(amounts in phr, based on total weight of first composition)

| | Example | | |
|---|---|---|---|
| phr | Comp. 1 Comparative Polymer A (EPT 8120E) plus 20 phr oil) | Inv. 1 FC EPDM 1/oil 20 phr oil | Inv. 2 FC EPDM 2/oil plus 20 phr oil) |
| Carbon Black (N774), phr | 140 | 140 | 140 |
| Inorganic Filler (CaCo3), phr | 55 | 55 | 55 |
| Oil, phr | 80 | 80 | 80 |

The specific foam formulations are shown in Table 7, which are representative formulations used sponge weatherstrips. Properties of the cured compounds were evaluated as compression molded plaques (see below) or as a foamed extruded tape (see below). Results (t3, t5, ML, MH, MH-ML, and t95) on the second pass compositions of Table 7 are shown in Table 8.

TABLE 7

Second Pass Compositions - foamed formulations
(amounts in phr, based on total weight of first composition

| | Example | | |
|---|---|---|---|
| | $2^{nd}$ Pass Comparative Polymer A Comparative Polymer A | $2^{nd}$ pass Inv. 1 FC EPDM 1/oil | $2^{nd}$ pass Inv. 2 FC EPDM 2/oil |
| First pass compound, phr | 395 (contains 100 phr FC) | 395 (contains 100 phr FC) | 395 (contains 100 phr FC) |
| Sulfur, phr | 1.5 | 1.5 | 1.5 |
| 2,2 Dibenzothiazyl disulfide (MBTS) accelerator, phr | 1.1 | 1.1 | 1.1 |
| Zinc dibenzyl dithiocarbamate (ZBEC), phr | 0.5 | 0.5 | 0.5 |
| Tetrabenzyl thiuram disulfide (TBzTD), phr | 0.8 | 0.8 | 0.8 |
| Tellurium Diethyl/ Dithiocarbamate (TDEC), phr | 0.2 | 0.2 | 0.2 |
| Zinc dicyanato diamine, phr | 0.7 | 0.7 | 0.7 |
| ZnO, phr | 5 | 5 | 5 |
| Stearic acid, phr | 2 | 2 | 2 |
| Calcium oxide, phr | 5 | 5 | 5 |
| Polyethylene glycol (PEG 4000), phr | 3 | 3 | 3 |
| Blowing agent*, phr | 3 | 3 | 3 |

*3 phr of CELOGEN OT blowing agent to be added during milling step

Solid Compression Molded Plaque

The physical properties of the non-foamed compositions (second pass composition, but pressed and not foamed) were measured from plaques, cured in a compression molder (for tensile, compression set testing). The samples were compression molded in accordance to ASTM D3182 using a PHI (100 ton press).

Samples were conditioned for 24 hours at room temperature, prior to testing. The desired mold (6"×6"×⅛" plaque or compression buttons) was in platen. Each Sample (uncured blanket) was cut slightly smaller than the dimensions of the individual mold cavity. The mill direction was marked, and the sample was labeled. The brush was sprayed lightly with a dilute solution of silicone and applied to the mold. Samples were placed in the preheated mold (at 200° C.), taking care to place properly for mill direction. The platens were closed. The "normal" operating pressure was 100 tons, at 200° C. or as shown on the gauge as 200,000 pounds. To vulcanize the samples, samples were pressed at 200° C., using t95 data (see Table 8) plus three minutes for plaques, and t95 data (see Table 8) plus 15 minutes for compression set buttons. When the cure time ended, the bottom platen was automatically opened. The samples were removed, and immediately placed in the water to stop curing. Results (100% Mod, Tensile at break, % Elongation at Ultimate tensile, Tear Strength and compression set) are shown in Table 8.

Extrusion of Compounds

For the foaming tests, the uncured formulations (second pass composition) were mixed on the Roll Mill to form a blanket of the uncured formulation. Uncured EPDM blankets were cut into strips, and then extruded into tapes, using a CW Brabender Intelli-Torque Plasti-Corder, equipped with a single screw extruder with an attached 1 inch tape die. The temperature profile was 70° C., 80° C., and 90° C. at the die. The extruder was operated at 50 rpm. It was observed that the tapes made with the inventive compositions had a smooth appearance, with no visible defects.

Foaming. Tapes were cut to the following dimensions: 20 cm×2.54 cm×1.5 mm thick, and the resulting tapes were laid horizontally in a hot-air oven. The resulting tapes were cured, at 240° C. for four minutes, in a hot air oven. After the thermal treatment, the foamed, crosslinked tapes were cooled in a freezer set at −20° C. The foamed, crosslinked tapes were conditioned for 24 hours at room temperature, prior to testing (specific gravity and change in mass for water absorption). Results are shown in Table 8.

TABLE 8

Properties

| | | | Example | | |
|---|---|---|---|---|---|
| | | | Inventive | | Comparative |
| | Units | Presentation | FC EPDM 1/oil | FC EPDM 2/oil | Polymer A (EPT 8120E) |
| Mooney* (ML (1 + 4) 100° C.) | Mu | first pass composition | 27 | 27 | 47 |
| t3 | [M.m] | Second Pass composition | 3.7 | 3.8 | 3.7 |

TABLE 8-continued

Properties

|  | Units | Presentation | Inventive FC EPDM 1/oil | Inventive FC EPDM 2/oil | Comparative Polymer A (EPT 8120E) |
|---|---|---|---|---|---|
| t5 | [M.m] | Second pass composition | 4.0 | 4.0 | 3.9 |
| ML | [dNm] | Second pass composition | 0.6 | 0.8 | 1.3 |
| MH | [dNm] | Second pass composition | 10.6 | 11.3 | 11.0 |
| MH – ML | [dNm] | Second pass composition | 9.9 | 10.5 | 9.7 |
| t95 | [min] | Second pass composition | 7.3 | 8.0 | 7.3 |
| Specific gravity | [g/cc] | Foamed tape | 0.76 | 0.73 | 0.61 |
| Change in mass for water absorption test | [%] | Foamed tape | 25 | 33 | 21 |
| 100% Mod | [MPa] | Solid Compression molded plaque | 1.6 | 1.5 | 1.8 |
| Tensile@Brk | [MPa] | Solid Compression molded plaque | 7.9 | 7.5 | 9.6 |
| % Elg@UT | [%] | Solid Compression molded plaque | 563 | 542 | 466 |
| Tear Strength M | [N/mm] | Solid Compression molded plaque | 23 | 23 | 21 |
| CS Mean | [%] | Solid Compression molded plaque | 40 | 42 | 46 |

*Mooney of cured formulation without blowing agent.

In terms of the curing behavior, Table 8 shows that the inventive polymers have similar scorch performance and cure rates relative to the comparative examples as shown by the t3/t5 and the t95, respectively. The key aspect to highlight from the MDR is that the inventive examples exhibit comparable or a higher degree of cure (MH-ML) relative to comparative polymer A as a result of initiating the crosslinks from a more flexible matrix (low ML) and fully curing and forming a tight network (comparable MH).

For the foamed article, Table 8 shows that the inventive examples exhibit a final density and a change in mass after immersing the sample in water comparable to the comparative example, indicating that despite differences in the polymer architecture both foam in a similar fashion. Note that foaming characteristics of each one of the compounds were evaluated at a lab scale and do not offer all the conditions for proper foaming. In this type of applications, density and water uptake have typical values of 0.6 and <3%, respectively. Differences between the target values and those measured are explained by the different temperature profile experienced in a convection oven versus an industrial set up where the article's surface cures slower. In the convection oven, the generated gas from the blowing agent escapes before the compound sets therefore limiting expansion of the material and favoring poor skin surface that favors the pass of water into the foamed structure. Foaming in an industrial set up where curing conditions of the skin are better controlled eliminates this issue.

Physical properties of the compression molded plaque shows that both tear strength and compression set benefit from the linear architecture covered in this invention. The advantage of the linear nature versus a highly branched structure is that for the same degree of crosslinking, the linear molecule has a higher molecular weight between crosslinks (Mc). Compression set being particularly important for weatherstrips as the ability of the article to return to its original thickness after deformation, translates into the use of less material. Target thickness after set is critical to seal and eliminate leak points for the passage of noise or water to the car's interior. In the case of the inventive examples disclosed here, the material volume savings is close to 10% as a result of the inventive examples' lower compression (40%) relative to the comparative example (46%). See results in Table 8.

The invention claimed is:
1. A first composition comprising:
an in-reactor blend of
(i) from 32 to 38 wt % of a first ethylene/propylene/nonconjugated polyene interpolymer having the following properties
  1) a molecular weight distribution ($M_w/M_n$, MWD(conv)) from 2.7 to 3.0,
  2) a z average molecular weight (Mz) from 900,000 g/mol to 950,000 g/mol,
  3) a tan delta (0.1 rad/s, 190° C.) from 1.1 to 1.2,
  4) a tan delta (100 rad/s, 190° C.) from 0.2 to 0.3, and
  5) an absolute value of a tan delta slope defined as

$$m = \left| \frac{[tandelta_{@0.1\ rad/s} - tandelta_{@100\ rad/s}] * 1000}{0.1\ rad/s - 100\ rad/s} \right|,$$

and m is from 9.0 to 10.0, and
(ii) from 68 to 62 wt % of a second ethylene/propylene/nonconjugated polyene interpolymer;
wherein the first composition contains no crosslinking agent and comprises the following properties:
a) a molecular weight distribution ($M_w/M_n$, MWD(conv)) from greater than 3.5 to less than 6.0;
b) a z average molecular weight (Mz) from greater than or equal to 900,000 g/mol to less than or equal to 1,000,000 g/mol; and
c) an absolute value of a tan delta slope defined as $$m = \left| \frac{[tandelta_{@0.1\ rad/s} - tandelta_{@100\ rad/s}] * 1000}{0.1\ rad/s - 100\ rad/s} \right|,$$

and m is from 4.0 to 8.0 s/rad.

2. The first composition of claim 1, wherein the first composition has a tan delta, at 0.1 rad/sec and 190° C., from greater than 1.00 to 1.35.

3. The first composition of claim 1, wherein the first composition further comprises an oil.

4. The first composition of claim 1, wherein the first composition has a Mooney Viscosity (ML1+4, 125° C.) from 30 to 70.

5. The first composition of claim 1, wherein the first composition has a density ≤0.870 g/cc.

6. The first composition of claim 1, wherein the first interpolymer and the second interpolymer comprise greater than or equal to 95 wt % of the total weight of the first composition.

7. A composition comprising the first composition of claim 1.

8. An article comprising at least one component formed from the composition of claim 7.

9. The first composition of claim 1 wherein the first composition has a viscosity at 0.1 rad/sec, 190° C., from greater than 200,000 Pa-s to 300,000 Pa-s.

10. The first composition of claim 9 wherein the first composition has a g' value from greater than or equal to 0.7 to less than or equal to 0.9.

11. The first composition of claim 10 wherein the first composition comprises from greater than 8 wt % to 10 wt % polyene.

12. The first composition of claim 11 wherein the first composition has a weight average molecular weight (Mw) from greater than or equal to 230,000 g/mol to less than or equal 500,000 g/mol and a molecular weight distribution ($M_w/M_n$, MWD(conv)) from greater than 4.0 to less than 6.0.

13. The first composition of claim 12 wherein the first composition comprises from 55 wt % to 60 wt % ethylene.

14. The first composition of claim 13 wherein the first composition has a peak area from 21.3 to 21.8 ppm from greater than 15% to 25%.

15. The first composition of claim 14 wherein the first composition meets the following relationship $$\tan \text{delta}(0.1 \text{ rad/s}) \geq -(6.054 \times 10^{-7} \text{ mol/g}) \times Mz + 1.25.$$

* * * * *